United States Patent [19]

Feuling

[11] Patent Number: 4,695,229
[45] Date of Patent: Sep. 22, 1987

[54] FRICTION REDUCTION FOR MOVING ELEMENTS IN CONTACT WITH A FLUID MEDIUM

[76] Inventor: James J. Feuling, 686 Ash, Chula Vista, Calif. 92010

[21] Appl. No.: 892,374

[22] Filed: Aug. 4, 1986

Related U.S. Application Data

[62] Division of Ser. No. 611,128, May 17, 1984.

[51] Int. Cl.⁴ .............................................. B63B 1/34
[52] U.S. Cl. .................................. 416/241 A; 416/224
[58] Field of Search ............... 416/241 A, 241 R, 224, 416/197 A

[56] References Cited

U.S. PATENT DOCUMENTS 3,551,067 12/1970 Wissman .......................... 416/241 A
3,575,123  4/1971 Shepherd et al. ............... 416/241 A
3,744,931  7/1973 Cavanagh ....................... 416/241 A
4,483,268 11/1984 Pichl ............................... 416/241 A

FOREIGN PATENT DOCUMENTS 572576 9/1977 U.S.S.R. .......................... 416/241 A

Primary Examiner—Craig R. Feinberg
Attorney, Agent, or Firm—Frank D. Gilliam

[57] ABSTRACT

The invention relates to the smooth coating with a lyophilic (non-welling) material the passive surfaces of elements moving through or having contact with a fluid medium, such as, water, oil or the like. In one embodiment the under surfaces of the pistons, outer surfaces of the connecting rods and the crank shaft of an internal combustion engine are coated with polytetrafluoroethylene or the like which is lyophilic to the lubricating oil to which it comes in contact. Other embodiments employ lyophilic smooth coatings for ship rudders and outboard lower end units.

9 Claims, 3 Drawing Figures

FRICTION REDUCTION FOR MOVING ELEMENTS IN CONTACT WITH A FLUID MEDIUM

This is a division of application Ser. No. 611,128, filed May 17, 1984 still pending.

BACKGROUND OF THE INVENTION

This invention relates to the reduction of friction between moving passive elements and more partially to lyophilic coated passive surfaces of elements having contact and relative movement with a fluid medium.

Great care has been taken to reduce the friction between metal to metal contacting power producing elements within the crank case of a modern internal combustion engine. For example, bearing surface materials are continually improved as are the lubricating oils (synthetic or natural) commonly used to lubricate those bearings.

The outer surfaces of the rotating and reciprocating elements within the crank case have been overlooked with respect to the boundary layer friction produced by their movement, at least partially, through the lubrication oils within an engine crankcase.

Efforts have been made to slick coat the internal surfaces of intake manifolds of internal combustion engines as taught James W. Schwerdt in U.S. Pat. No. 3,102,515 issued Sept. 3, 1963.

Coating of the inner surfaces of exhaust with vitreous porcelain enamel for use with internal combustion engines was taught by E. H. Weil in U.S. Pat. No. 1,512,961, issued Feb. 11, 1918.

Coating of the inner surfaces of a carburetor used with an internal combustion engine to prevent icing and the resulting engine stall was taught by Vladimir Haensel et al., in U.S. Pat. No. 2,899,943, issued Aug. 18, 1959. This patent taught the use of hydrophobic materials that were not wetted by water. The materials included the chemical condensation of phenol-formaldehyde, phenol-furfural, urea-formaldehyde, melamine-formaldehyde, aniline-formaldehyde, etc., polyvinyl chloride, polyvinylidene chloride, vinyl chloride-vinyl acetate copolymers, Teflon, polymerized monochlortrifluoroethylene, polyether (EPON) resins, polyvinylbutyral, polyesters (such as those based on phthalic, maleic, or "carbic" anhydride, and or various polyols as well as on allyl alcohol," etc.

In British Pat. No. 1,152,957, published May 21, 1969, by Cecil Arthur Creber lyophilic coatings were taught for use on carbon build up areas within an internal combustion engine. Creber taught that coating the combustion spaces of cylinder heads, unplated cylinder walls, poppet valve heads, valve sterns, valve guides, and inlet and exhaust ports and passages with polytetrafluoroethylene prevented carbon build up and reduced friction. This is, however, generally ineffective due to coating burn off after a short engine operation time.

*Discover* magazine for April 1984, at pages 67–71 teaches the need for slippery skins for speedier submarines and teaches employing mucus-like plastic or the secretions of clouds of microscopic bubbles, heated hulls, hulls covered with fine grooves and hulls with soft skins that subtly change shape for this purpose.

The prior art is completely void of any suggestion of a problem due to boundary layer friction produced by the mere movement of passive surfaces of active elements, for example, in the crank case of an internal combustion engine and, therefore, have not addressed a solution for the reduction of this drag friction.

Obviously, it is important in this era of fuel shortages and high economic costs of fuels to eliminate as much boundary layer induced friction encountered by passive moving parts as possible.

The problem of boundary layer induced drag friction produced by passive moving elements in a fluid medium and the reduction thereof has not been approached prior to the emergence of this invention.

SUMMARY OF THE INVENTION

An object of this invention is to reduce or eliminate boundary layer drag friction caused by the movement of passive elements through or in partial contact with a fluid medium.

Another object of this invention is to produce a passive element which is caused to move through or be in partial moving contact with a fluid medium that has a smooth non-wetting outer surface.

Still another object of this invention is to apply one or more coatings of an lyophilic material to the outer or passive surface of an element moving through or having partial moving contact with a fluid medium such as, oil, water or the like.

In accordance with the present invention the friction produced by the passive surfaces of moving elements through or partially in contact with a fluid medium are coated with a non-wetting material which provides a smooth or slick contacting surface to considerably reduce or substantially eliminate that frictional contact.

The above as well as additional objects and desirable results will be clarified in the following description wherein reference numerals refer to like-numbered parts or elements in the accompanying drawings. It is to be noted that the drawing figures are intended primarily for the purpose of illustration and that it is therefore neither desired nor intended to limit the invention necessarily to any or all of the exact details shown or described except insofar as they may be deemed essential to the invention.

DETAILED DESCRIPTION OF THE DRAWINGS

Figure 1:
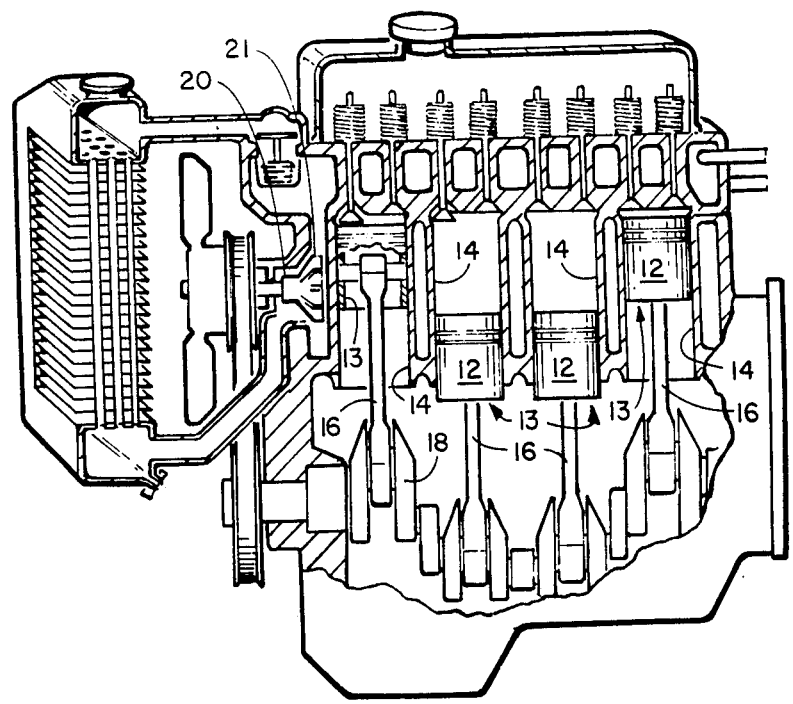
FIG. 1 is a perspective cut-away showing of an internal combustion engine employing the invention.

Referring now to the drawing Figures depicting devices employing the present invention. It should be understood that the Figures are chosen only for convenience and ease of explanation of the present invention and are not intended to be limitations in any respect. Further, the invention concepts set forth herein may be equally applicable to any device wherein the passive surfaces of mechanisms are in contact with a fluid which tends to adhere thereto. Such fluids may be gaseous, water or petroleum products but these specific fluids should not be considered a limitation to the fluid medium to which this invention is directed.

Referring now specifically to FIG. 1, an internal combustion engine 10 is shown in partial cut-away exposing the pistons 12, the cylinders 14 in which they operate, connecting rods 16, crank shaft 18, sump or oil pan portion 20, the water pump 22, and additional components normal to such an engine which do not form any part of the present invention concepts.

It should be obvious that the inner surfaces 13 of the piston 12, and the outer surfaces of the connecting rods 16 and crank shaft 18 and the wall surfaces 21 of the pump 20 are passive surfaces not employed per se in the operation of the engine or water pump.

In an internal combustion engine of the type shown, the sump or oil pan area contains the lubricating oil normally used for engine lubrication.

Substantially all of the metal to metal components of the engine have lubricating oil therebetween for the reduction of friction and cooling.

When the engine shown is in a normal operating mode, the lubricating oil is constantly being flung about within the sump or pan area of the engine. This lubricating oil is constantly wetting the exterior surfaces of the connecting rods, crank shaft and the inner surface of the pistons. This wetting condition creates a degree of friction to the movement of those components consequently reducing the efficiency of the engine and producing increased heating. Likewise when the engine is in operation the walls of the pump 20 are wetted by the cooling solution being pumped by the vanes thereby adding an additional amount of friction to the engine operation.

The friction created by the passive surface of such components can be substantially eliminated by coating these surfaces with an anti-wetting, hydrophobic or lyophilic materal. In some circumstances a single coat is sufficient and in other circumstances it may be necessary to apply several successive layers of coats. Further, enhancement may be obtained if the surfaces to be coated are first made smooth prior to the application of the anti-wetting material.

Although a large number of coating materials are suitable for use in the present invention and these may differ considerably in chemical type, they all have in common properties of being petroleum resistant, anti-mucilaginous and anti-wetting. They prevent the wetting of the passive surfaces of the type aforementioned.

As hereinbefore mentioned, any suitable coating material meeting the requirements specified above may be employed in accordance with the present invention. A particularly preferred coating material is polytetrafluoroethylene. Other products such those discussed and described in U.S. Pat. No. 2,899,943 may also be employed.

Before any attempt is made to coat with polytetrafluoroethylene or the like, the parent material to which it is to be bonded must be free of any rust, dirt or grease and present a surface which will permit the polytetrafluoroethylene, or other selected material, to bond either into physical indentations in the material or intergranular into the metallic structure.

The method of preparation can be made by machining the surfaces, sand blasting, shot peening followed by cleaning by a volatile solvent, acid or alkali solution, then washing and thorough drying, avoiding oxidation of the parent material.

If sand blasting or the like is not used and the surface does not have a surface suitable for adhesion of polytetrafluoroethylene or the like, the surface can be prepared by the use of etchants such as diluted hydrochloric, chromic or phosphoric acid. The object being to obtain a surface porous or rough enough to give a good bond and yet present a smooth working surface when coated with the polytetrafluoroethylene.

The use of suitable primer coats or a special one coat mixture as marketed by the manufacture of the anti-wetting material to be used, in which an etch is present, might in some cases avoid the use of a separate etch or roughing treatments, depending on the original surface condition.

Suitable masking is employed during the coating application to prevent the anti-wetting material from being deposited on undesirable locations on the treated parts.

The degree of thickness of the coating or coatings is not critical except that sufficient anti-wetting material should be applied to present a smooth outer surface.

Figures 2, 3:
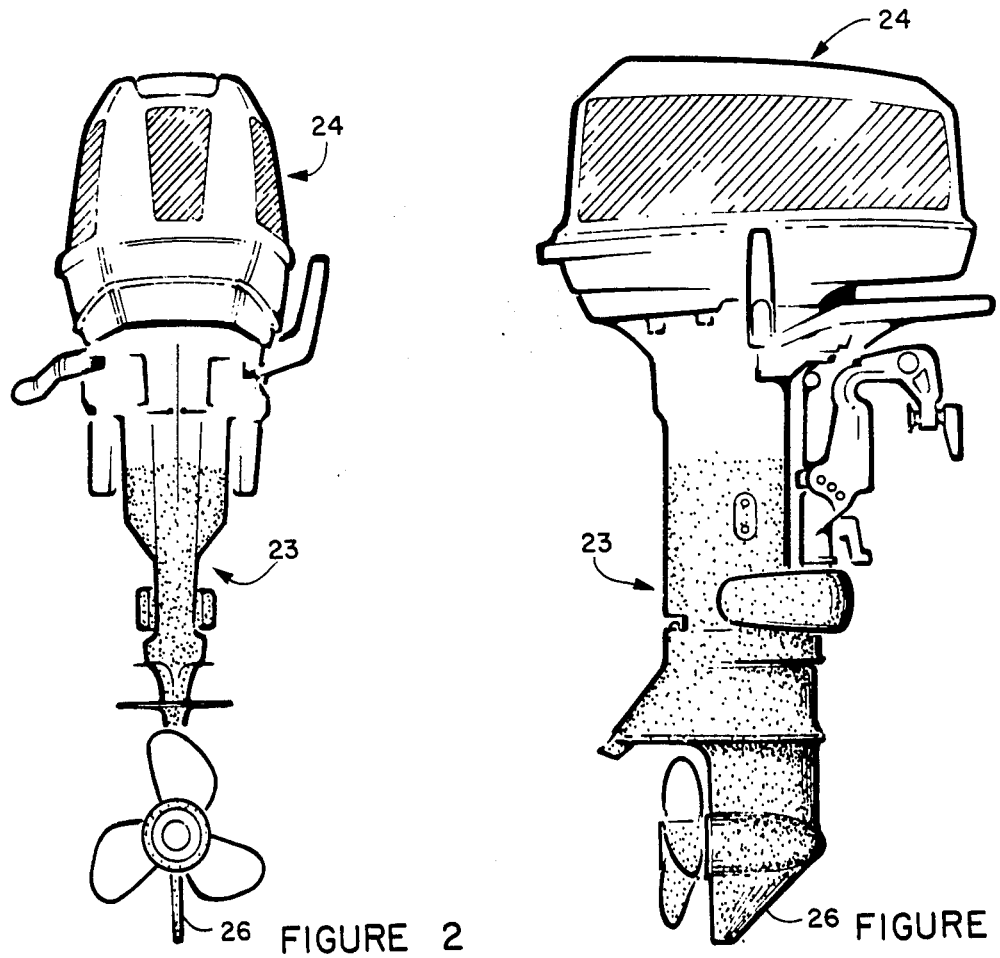
FIGS. 2 and 3 are showings of the lower end of an outboard motor employing the invention.

Referring now to FIGS. 2 and 3, the lower end or water immersed portion 23 of an outboard motor 24 with the propeller and rudder 26. The showing is illustrative of the principle of applying the anti-wetting material to objects that have passive relative movement in a fluid, such as those dotted areas shown, and also by way of explanation and not by way of limitation, non-working surfaces of ships, airplanes, and the like where adverse boundary layer effect is present.

Obviously, the invention applies to a large scope of applications and those applications are not intended to be limited by the above specifications.

The invention having thus been described, what is claimed and desired to be secured by Letters Patent is as follows:

1. In a mechanical device having both active working and passive non-working surfaces, said both surfaces having relative movement with a liquid, said passive surfaces only being coated with a material lyophilic to said liquid, the coated surfaces substantially eliminating boundary layer friction therebetween; wherein said device is a liquid pump having only passive non-working walls of said pumps forming said passive surfaces which are coated with said lyophilic material.

2. The invention as defined in claim 1 wherein the lyophilic material comprises at least a layer of polytetrafluoroethylene.

3. The invention as defined in claim 1 wherein the lyophilic material is a polymer base material.

4. The invention as defined in claim 1 wherein said pump includes an impeller having vanes with passive non-working portions of only which are coated with said lyophilic material.

5. The invention as defined in claim 1 wherein said liquid is water and the coating material is lyophilic to water.

6. The invention as defined in claim 1 wherein the liquid pump is an outboard motor for a boat and the passive surfaces of said pump having contact with water are coated with said lyophilic material.

7. The invention as defined in claim 1 wherein the liquid pump is a propeller on a boat with passive non-working portions of said propeller only which are coated with said lyophilic material.

8. The invention as defined in claim 7 wherein said boat further includes a rudder and said rudder is coated with said lyophilic material.

9. A product produced from the method of claim 1.

* * * * *

UNITED STATES PATENT AND TRADEMARK OFFICE
CERTIFICATE OF CORRECTION

PATENT NO. : 4,695,229

DATED : September 22, 1987

INVENTOR(S) : JAMES J. FEULING

It is certified that error appears in the above-identified patent and that said Letters Patent is hereby corrected as shown below:

In the following locations change "lyophilic" to --lyophobic--.

On the Title Page, in the Abstract, lines 2, 8, and 10; column 1, line 12; column 2, line 23; column 3, line 30; and column 4, lines 35, 42, 45, 49, 51, 56, 60 and 63.

On the Title Page, in the Abstract, line 2, change "non-welling" to --non-wetting--.

Signed and Sealed this

Twenty-first Day of March, 1989

Attest:

*Attesting Officer*

DONALD J. QUIGG

*Commissioner of Patents and Trademarks*